United States Patent [19]

Samuels

[11] Patent Number: 5,429,864

[45] Date of Patent: Jul. 4, 1995

[54] HIGH EFFICIENCY FILTER FABRIC FOR HOT GAS FILTRATION

[75] Inventor: Sam L. Samuels, Landenberg, Pa.

[73] Assignee: E. I. Du Pont de Nemours and Company, Wilmington, Del.

[21] Appl. No.: 132,691

[22] Filed: Oct. 6, 1993

[51] Int. Cl.⁶ ............ B32B 5/06; B32B 7/00; B01D 46/02

[52] U.S. Cl. ............ 428/229; 28/107; 55/381; 55/382; 55/528; 156/148; 156/181; 156/182; 428/234; 428/247; 428/300; 428/902; 428/903

[58] Field of Search ........ 428/229, 234, 282, 300, 428/902, 903, 247; 28/107; 55/381, 382, 528; 156/148, 181, 182

[56] References Cited

U.S. PATENT DOCUMENTS

| | | |
|---|---|---|
| 4,143,197 | 3/1979 | Jasionwicz et al. ............ 428/225 |
| 4,524,103 | 6/1985 | Seager ............ 428/338 |
| 4,589,894 | 5/1986 | Gin et al. ............ 55/274 |
| 4,963,298 | 10/1990 | Allen et al. ............ 264/12 |
| 5,171,339 | 12/1992 | Forsten ............ 55/379 |

FOREIGN PATENT DOCUMENTS

| | | |
|---|---|---|
| 63-2365A | 1/1988 | Japan. |
| 63-22814A | 1/1988 | Japan. |

OTHER PUBLICATIONS

Peter E. Frankenburg, "Tefaire" Felt-An Industrial Fabric Designated for the Filtration of Particulates in a Hostile Environment, *Journal of Industrial Fabrics*, vol. 4, No. 4, pp. 12-15, 1986.

*Primary Examiner*—James D. Withers

[57] ABSTRACT

A nonwoven aramid staple fiber batt is needled into a woven aramid scrim which is overlayed with a thin mat of heat resistant microfiber to give marked improvement in hot gas filtration.

4 Claims, No Drawings

HIGH EFFICIENCY FILTER FABRIC FOR HOT GAS FILTRATION

BACKGROUND OF THE INVENTION

The use of fabric filters has grown significantly as environmental standards for particulate emissions have become more stringent. Fabric filters are used because they are highly efficient, easily operated and in many cases the least expensive method of control of such emissions. Filter bag fabric is of extreme importance since one fabric may function much better than another fabric in the same environment. New filter fabric constructions of improved filtering capacity is a desirable goal.

SUMMARY OF THE INVENTION

The present invention provides a fabric with improved filtering properties for hot gas filtration. It comprises a nonwoven aramid staple fiber batt needled to a woven aramid scrim overlayed with a mat of sub-denier aramid microfiber, said mat having a basis weight of from 0.5 to 2 ounces per square yard.

DETAILED DESCRIPTION OF THE INVENTION

In accordance with the present invention, it has been found that incorporation of a low basis weight mat of aramid microfiber in the construction of a fabric filter comprising an aramid staple fiber batt needled to a scrim substantially improves the efficiency of the filter for filtration of gases at temperatures of from 160° C. to 260° C. Construction of the filter fabric of the invention is readily achieved. The base substrate is a lightweight scrim made of staple yarn from an aramid such as poly(m-phenylene isophthalamide) MPD-I. The scrim should have a basis weight of from about 2 to 4 ounces per square yard. Its purpose is to contribute strength and rigidity to the filter fabric without unduly contributing to the fabric weight.

A mat of aramid microfiber is next overlayed on the scrim. The microfiber employed in this invention has a denier of up to 0.2 denier per filament (dpf). The microfiber length may vary since it would not be expected to affect the properties of the product. Such microfiber cannot be carded adequately and therefore are not suitable for needling directly to the scrim. The mat may be prepared as described in U.S. Pat. No. 4,963,298 and WO 9201829-A and may comprise microfiber from any high temperature resistant polymer such as poly(p-phenylene terephthalamide) PPD-T, MPD-I or other polymer such as polybenzimidazol, polyetherketoneketone or polyetheretherketone intended for use above 160° C. Useful mats will have a basis weight of from 0.5 to 2 ounces per square yard. The mat is adhered to the scrim by virtue of a batt of heat resistant staple fiber such as MPD-I which is laid on top of the microfiber mat and then needled to the scrim. The staple fiber batt contains the mat of microfiber within the filter fabric and helps prevent loss of the microfiber. Useful staple fiber batts will have a basis weight of from 3 to 6 ounces per square yard. The staple fiber for the batt will have a dpf from 0.8 to 3 and typically have a length of about 1.5 inches.

The above procedure describes the use of a microfiber mat on one surface of the scrim. If desired, the process may be repeated on the other surface as well.

The following example is illustrative of the present invention and is not intended as limiting.

CONTROL

An aramid needlefelt filter was prepared as follows: A 5.4 ounces/square yard (opsy), carded, cross-lapped batt (I) was prepared from 2.0 denier poly(m-phenylene isophthalamide) staple fibers. A 4.0 opsy scrim (II) was prepared from 2.0 denier poly(m-phenylene isophthalamide) staple fibers which had been spun into yarn, and woven into scrim. Batt (I) was laid onto the scrim (II) and needled into it. The composite was flipped over, a second batt (I) was laid onto the other side of the scrim and needled into it. The sandwich structure (I/II/I) was then needled into the final filter structure which was heat set at 225° C. for two minutes. The final filter had a basis weight of 11.7 opsy, a thickness of 0.128 inches and an air permeability of 75.5 cubic feet/minute/square foot of fabric measured at 0.5 inches water pressure.

EXAMPLE

An aramid needlefelt filter incorporating layers of poly(p-phenylene terephthalamide) microfiber (III) prepared as described in U.S. Pat. No. 4,963,298 was made by placing a mat of (III) on each side of the scrim (II) before overlaying with batt (I) and needling. The mat (III) had a basis weight of about 0.5 opsy. The sandwich structure (I/III/II/III/I) was then needled to give the final filter structure which was heat set at 225° C. for two minutes. The final filter had a basis weight of 12.7 opsy, a thickness of 0.125 inches and an air permeability of 60.2 cubic feet/minute/square foot of fabric, measured at 0.5 inches water pressure.

The panel test apparatus described in the *Journal of Industrial Fabrics*, Volume 4, Number 4, 1986, in an article entitled, "TEFAIRE* Felt—An Industrial Fabric Designed for the Filtration of Particulates in a Hostile Environment", was used to test fabric efficiency. Fabrics were tested in each of 4 positions on the test apparatus, thus giving 4 independent sets of relative filtration efficiency measurements. Using AZ fine dust at an inlet load of 3.3 grains/cubic foot and an air to cloth ratio of 6 cubic feet/minute/square foot of filter, the fabrics were pulsed every 5 minutes during the test for cleaning. At the end of the test, the filters were removed and tested. Results shown below indicate significant improvements in filter efficiency [efficiency=(1penetration) ×100%] are realized when small amounts of microfiber are incorporated in the filter structure. In all runs, less dust penetrated the filter than was the case with the control and in most cases there was a substantial reduction.

| | Air Perm before test | Air Perm after test | Air Perm after vacuuming | Dust Penetration × $10^{-5}$ Test Position Number | | | |
|---|---|---|---|---|---|---|---|
| | | | | 1 | 2 | 3 | 4 |
| Control | 75.5 | 9.0 | 58.2 | 8 | 12 | 22 | 7 |
| Example | 60.2 | 9.1 | 47.8 | 1 | 6 | 8 | 6 |

I claim:

1. A fabric for filtration of gases at a temperature of from 160° C. to 260° C. comprising a nonwoven aramid staple fiber batt having a basis weight of about 3 to 6 oz/yd² needled to a woven aramid scrim having a basis weight of about 2 to 4 oz/yd² overlaid with a mat of heat resistant microfiber having a basis weight of about 0.5 to 2 oz/yd².

2. A fabric according to claim 1 wherein the heat resistant microfiber is an aramid.

3. A process for preparing the fabric of claim 1 comprising, laying the mat of heat resistant microfiber over the woven aramid scrim, covering the mat with the nonwoven aramid staple fiber batt and needling the batt into the scrim.

4. A process according to claim 3 wherein the heat resistant microfiber is an aramid.

* * * * *